United States Patent
Norris et al.

(10) Patent No.: US 11,639,154 B1
(45) Date of Patent: May 2, 2023

(54) SYSTEMS AND METHODS TO DETECT TAILGATE REMOVAL USING ALARM CIRCUITS

(71) Applicant: Toyota Motor Engineering & Manufacturing North America, Inc., Plano, TX (US)

(72) Inventors: Justin B. Norris, Brighton, MI (US); Frank A. Richards, Ann Arbor, MI (US); Alexander L. Paradis, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/498,163

(22) Filed: Oct. 11, 2021

(51) Int. Cl.
- *B60R 25/10* (2013.01)
- *B60R 1/00* (2022.01)
- *B60R 1/12* (2006.01)

(52) U.S. Cl.
CPC ............ *B60R 25/1001* (2013.01); *B60R 1/00* (2013.01); *B60R 25/1004* (2013.01); *B60R 2001/1253* (2013.01)

(58) Field of Classification Search
CPC ..... B60R 11/00; B60R 11/04; B60R 11/0484; B60R 25/00; B60R 25/10; B60R 25/1001; B60R 25/1004; B60R 1/00; H04N 5/14; H04N 5/225; H04N 5/2257; H04N 5/232; H04N 5/23206; H04N 5/23216; H04N 5/23225; H04N 5/23299; H04N 7/16; H04N 7/18; B65R 25/1253
See application file for complete search history.

(56) References Cited

U.S. PATENT DOCUMENTS

| 7,511,607 B2 | 3/2009 | Hubbard et al. |
| 10,740,796 B2 | 8/2020 | Brubaker |
| 10,780,841 B2 | 9/2020 | Shaeff et al. |
| 2014/0009616 A1* | 1/2014 | Nakamura ............. H04N 5/225 348/148 |
| 2022/0159179 A1* | 5/2022 | Mizuma ............. H04N 5/23206 |

FOREIGN PATENT DOCUMENTS

| CN | 210405466 U | 4/2020 |
| EP | 3626537 A1 | 3/2020 |
| JP | 5132924 B2 | 1/2013 |

OTHER PUBLICATIONS

NPL Search.*

* cited by examiner

*Primary Examiner* — Van T Trieu
(74) *Attorney, Agent, or Firm* — Dinsmore & Shohl LLP

(57) ABSTRACT

A vehicle includes a cabin and a vehicle body including a cargo area rearward of the cabin. A tailgate assembly is mounted to the vehicle body that closes the cargo area. The tailgate assembly includes a rear-mounted video camera. An electronic control unit receives image data from the rear-mounted video camera. A connector communicatively couples the electronic control unit and the rear-mounted video camera. The connector has a closed configuration with the tailgate assembly mounted to the vehicle body and an open configuration with the tailgate assembly removed from the vehicle body. The electronic control unit includes logic that, wherein executed by a processor, causes the electronic control unit to receive signals from an alarm circuit when the connector is in the closed configuration and detect when the signals from the alarm circuit have stopped when the connector is in the open configuration.

18 Claims, 7 Drawing Sheets

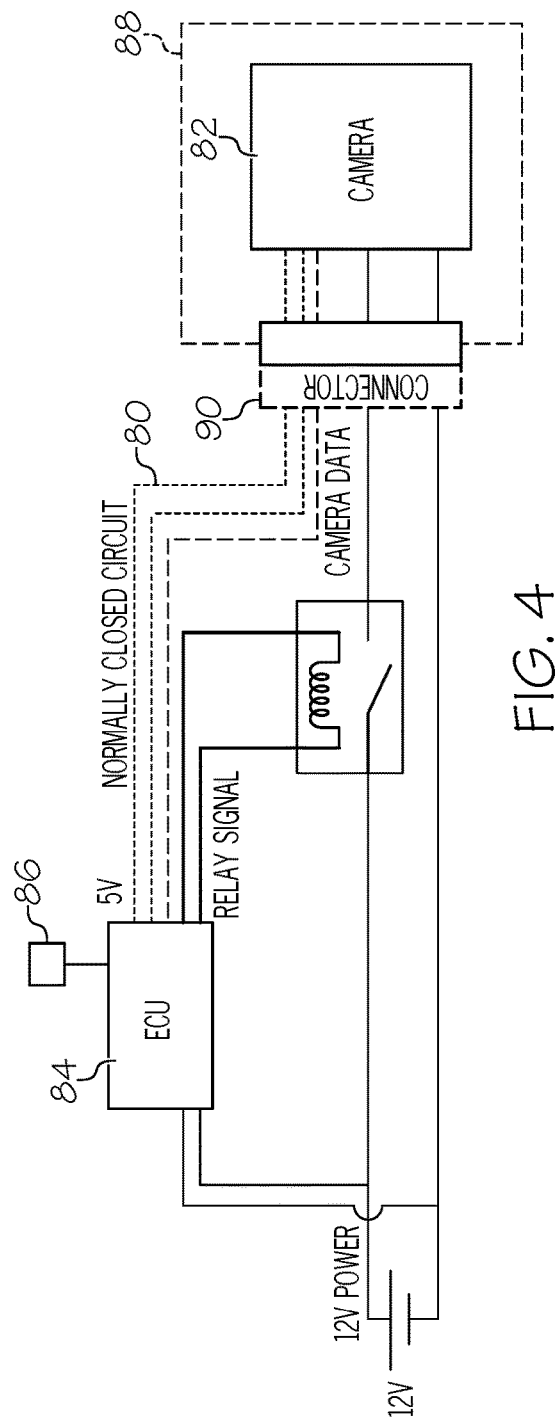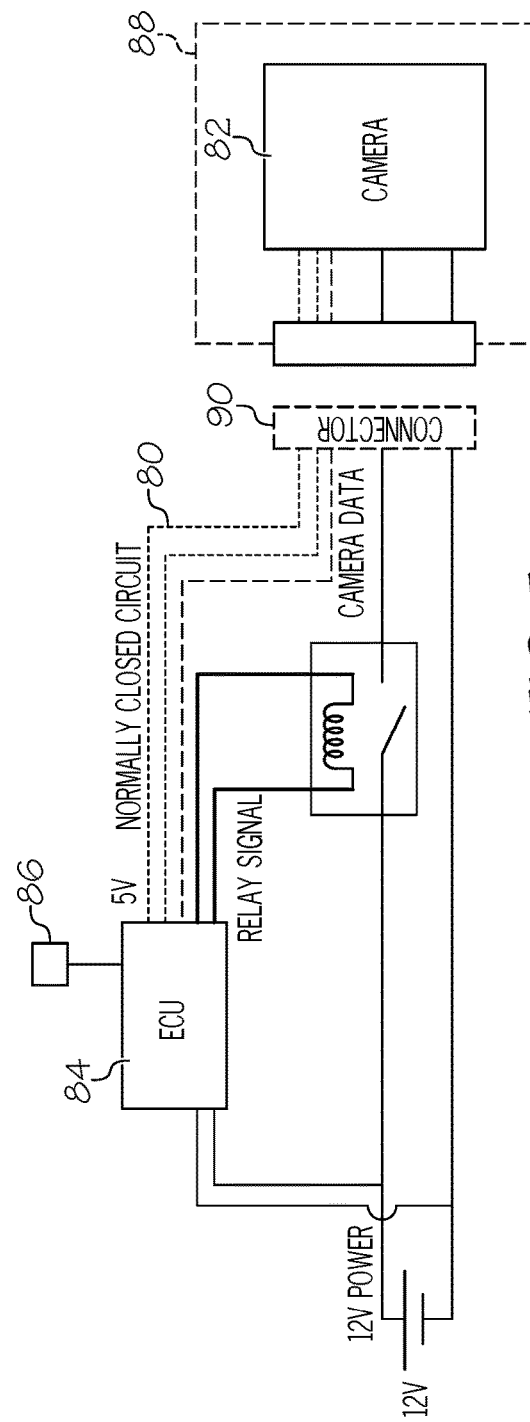

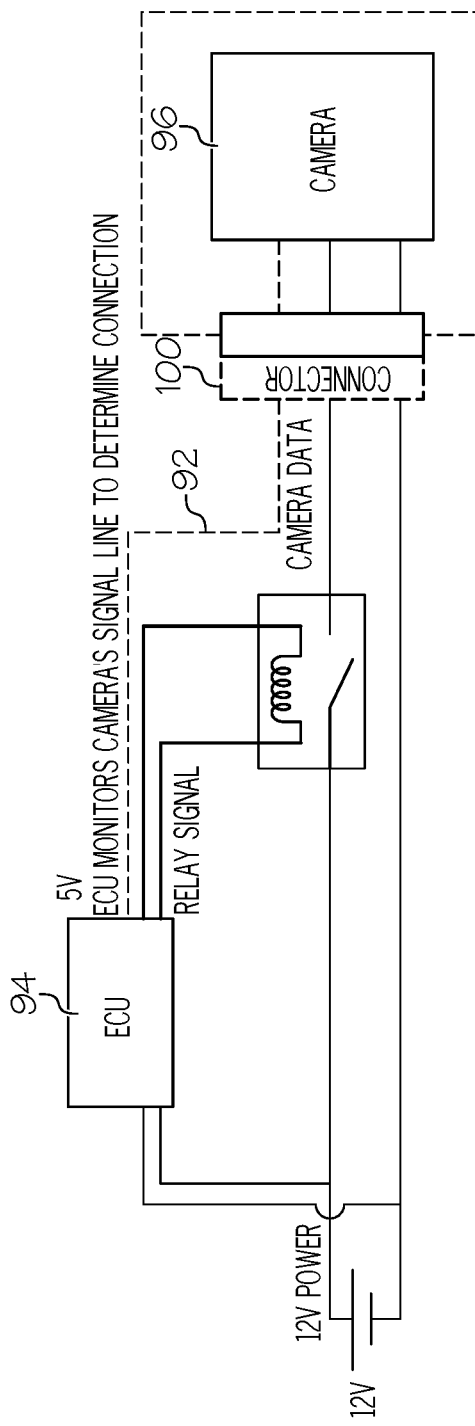
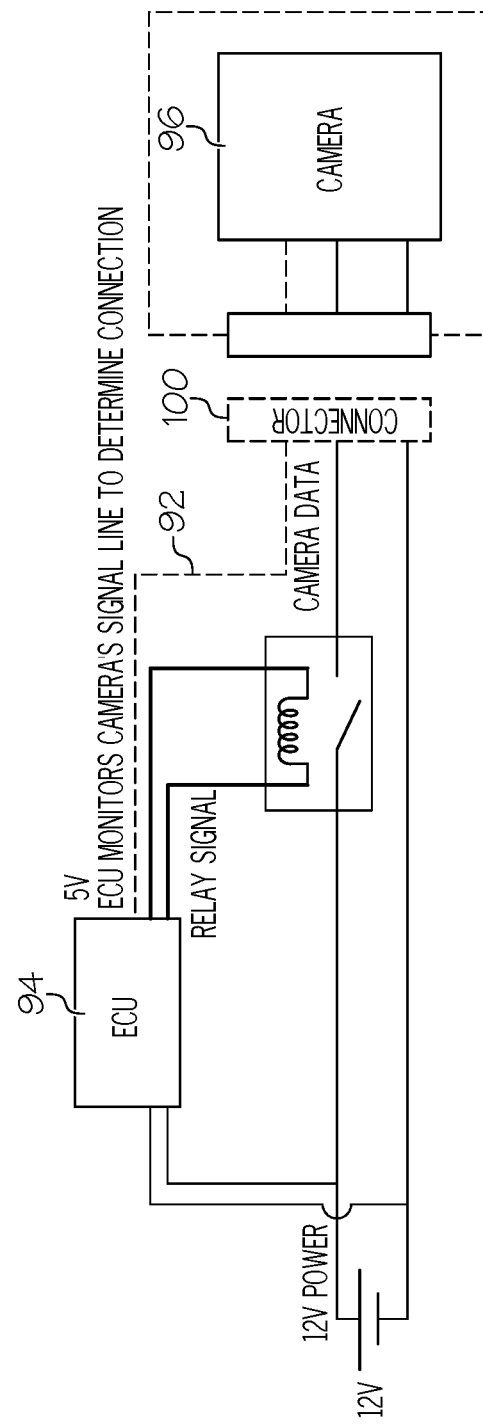

US 11,639,154 B1

SYSTEMS AND METHODS TO DETECT TAILGATE REMOVAL USING ALARM CIRCUITS

TECHNICAL FIELD

The present specification generally relates to alarm systems and methods and, more specifically, to systems and methods to detect tailgate removal using alarm circuits.

BACKGROUND

Load carrying vehicles, such as trucks, often have fold-down tailgates. Folded down, the tailgates extend the area of the truck bed. Folded up, the tailgates close off the truck bed. Some trucks have rear-mounted video cameras to provide an image at a rear of the truck. As tailgates may be straightforward to remove and replace, the tailgates themselves and their rear-mounted camera can be targets of theft.

Accordingly, a need exists for systems and methods to detect tailgate removal using alarm circuits that are connected to the rear-mounted video cameras.

SUMMARY

In one embodiment, a vehicle includes a cabin and a vehicle body including a cargo area rearward of the cabin. A tailgate assembly is mounted to the vehicle body that closes the cargo area. The tailgate assembly includes a rear-mounted video camera. An electronic control unit receives image data from the rear-mounted video camera. A connector communicatively couples the electronic control unit and the rear-mounted video camera. The connector has a closed configuration with the tailgate assembly mounted to the vehicle body and an open configuration with the tailgate assembly removed from the vehicle body. The electronic control unit includes logic that, wherein executed by a processor, causes the electronic control unit to receive signals from an alarm circuit when the connector is in the closed configuration and detect when the signals from the alarm circuit have stopped when the connector is in the open configuration.

In another embodiment, a method of providing an alarm circuit used by an electronic control unit in determining if a tailgate assembly of a vehicle has been removed from the vehicle body is provided. The method includes communicatively coupling the electronic control unit to a rear-mounted video camera carried by the tailgate assembly using a connector. The connector has a closed configuration with the tailgate assembly mounted to the vehicle body and an open configuration with the tailgate assembly removed from the vehicle body. An alarm circuit is communicatively coupled to the electronic control unit and the connector. The alarm circuit provides signals to the electronic control unit with the connector in the closed configuration. The electronic control unit includes logic that, when executed by a processor, detects that the signals from the alarm circuit have stopped and, in response, instructs an alarm to be activated.

In some embodiments, the electronic control unit determines whether one or more doors of the vehicle are in a locked state before instructing the alarm to be activated.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 is a schematic view of another tailgate alarm system of use with the vehicle of FIG. 1 in a closed configuration, according to one or more embodiments shown and described herein;

FIG. 5 is a schematic view of the another tailgate alarm system of FIG. 4 in an open configuration, according to one or more embodiments shown and described herein;

FIG. 6 is a schematic view of another tailgate alarm system of use with the vehicle of FIG. 1 in a closed configuration, according to one or more embodiments shown and described herein;

FIG. 7 is a schematic view of the another tailgate alarm system of FIG. 6 in an open configuration, according to one or more embodiments shown and described herein;

DETAILED DESCRIPTION

Embodiments described herein are generally related to vehicles and methods to detect unauthorized tailgate removal using alarm circuits. The vehicle includes the car alarm circuit that connects, either directly or indirectly, a rear-mounted camera mounted to the tailgate and an electronic control unit (ECU) of the vehicle. The alarm circuit includes an electrical connection to a releasable connector that is electrically connected to the rear-mounted camera through the tailgate. The ECU includes logic that detects when the rear-mounted camera is no longer electrically connected to the alarm circuit due to removal of the tailgate from the vehicle, which opens the releasable connector. Removal of the tailgate from the vehicle breaks the alarm circuit, which the ECU detects, and then the ECU causes a vehicle alarm to be provided. In some embodiments, the ECU detects whether one or more doors (e.g., the driver door) is in a locked state before causing the vehicle alarm to activate.

Figure 1:
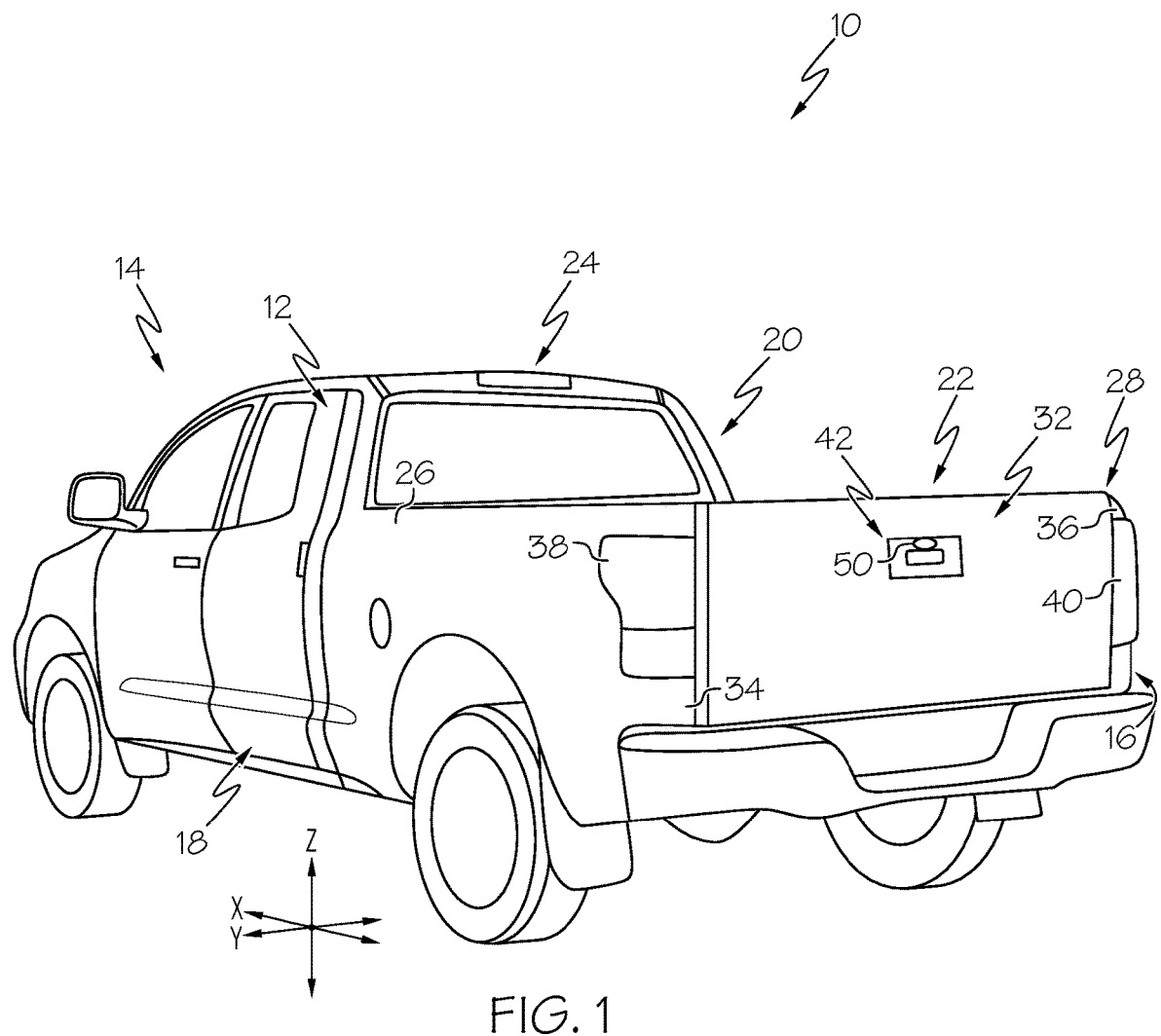
FIG. 1 is a perspective view of a vehicle including a vehicle video system and tailgate alarm system, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. The terms "outboard" or "outward" and "inboard" or "inward" as used herein refer to the relative location of a component with respect to a vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Referring to FIG. 1, a vehicle 10 includes a vehicle body 12 having a front 14, a rear 16 and sides 18 and 20 that extend between the front 14 and the rear 16 in the vehicle longitudinal direction. In the illustrated embodiment, the vehicle 10 is a truck including a cargo area 22 that is formed rearward of a cabin area 24 by sidewalls 26 and 28, floor and a tailgate assembly 32 that is located between the sidewalls 26 and 28. The sidewalls 26 and 28 may form tailgate posts 34 and 36 that may include taillights 38 and 40 and latch components (e.g., strikers) that can releasably connect to the tailgate assembly 32 for releasably latching the tailgate assembly 32 in a raised configuration, as shown. The tailgate assembly 32 may include a tailgate handle assembly 42 that can be used to release the tailgate assembly 32 from the latch components in order to place the tailgate assembly 32 in a lowered position. In the lowered position, the floor may be extended outward beyond a vehicle rear bumper assembly and increased access to the cargo area 22 can be provided. In some embodiments, the tailgate assembly 32 may be removable from the cargo area 22.

The vehicle 10 includes a rear-mounted video camera 50. The rear-mounted video camera 50 may be mounted at any suitable location on the tailgate assembly 32. In the illustrated example, the rear-mounted video camera 50 is mounted at the handle assembly 42. The rear-mounted video camera 50 can be used as a back-up camera and can generally provide video images of a field-of-view (FOV) rearward of the vehicle 10. The term "video" refers to a series of captured images within a FOV of the video camera.

Figure 2:
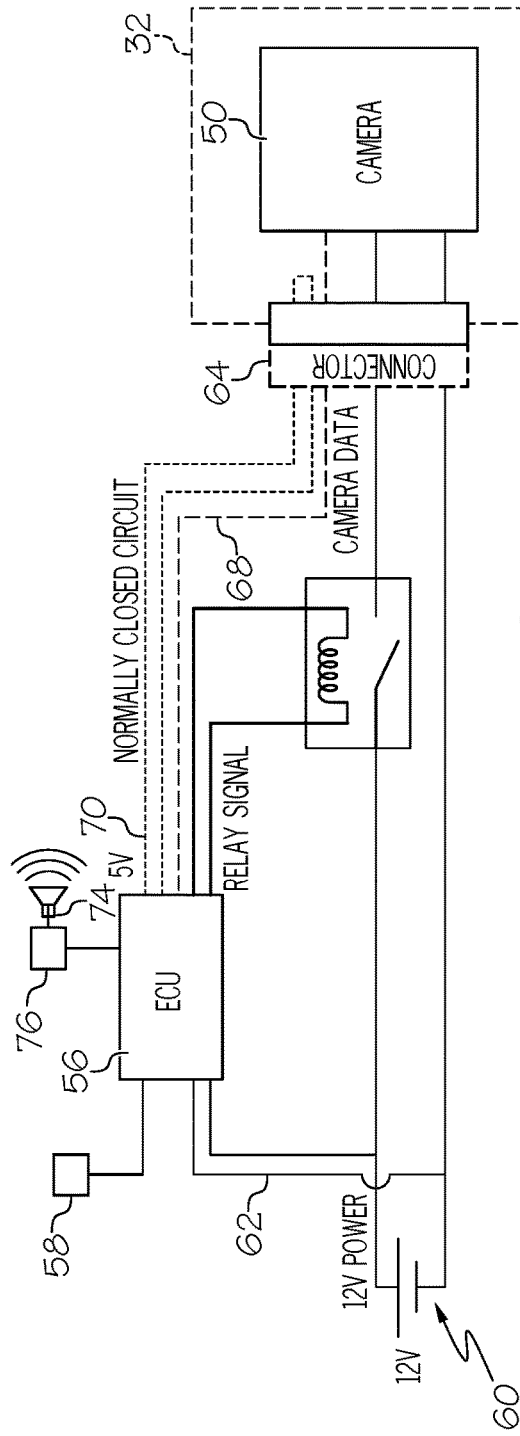
FIG. 2 is a schematic view of a tailgate alarm system of use with the vehicle of FIG. 1 in a closed configuration, according to one or more embodiments shown and described herein.

Referring to FIG. 2, the rear-mounted video camera 50 may be connected to an electronic control unit 56 (ECU) through the tailgate assembly 32, represented by dashed lines. The ECU 56 can provide image processing and memory storage capabilities. The ECU 56 may be connected to a display unit 58 that receives video processed by the ECU 56 based on video images that are captured by the rear-mounted video camera 50. The display unit 58 can display, for example, streaming video (live and/or recorded) from the rear-mounted video camera 50. The display unit 58 may have a response time, which is the amount of time that passes between activation of the vehicle video camera 50 or some other image capture initiation event (e.g., setting a reverse gear) and the display of the required FOV by the display unit 58. In some embodiments, the vehicle video camera 50 may be always active. The display unit 58 can be at least one of a heads-up display, an instrument cluster display, and a mobile device display. In some embodiments, the vehicle 10 may have a plurality of displays. In such embodiments, the vehicle 10 could also have a plurality of different types of displays. For example, and not as a limitation, the vehicle 10 could have an in-dashboard display and a heads-up display for displaying information directly on a windshield or other window. It should be noted that while a single ECU 56 is shown, ECU 56 may represent multiple ECUs with different functionalities.

The ECU 56 is connected to a power source 60 by an input power circuit 62. The input power circuit 62 may also be connected to the rear-mounted video camera 50 through a releasable connector 64 for supplying power thereto (e.g., using relay circuit 66) when the camera is activated. For example, the releasable connector 64 may be a two-piece connector with one piece carried by the vehicle body and the other mating piece carried by the tailgate. The ECU 56 is connected through the releasable connector 64 to the rear-mounted video camera 50 by a camera data connection 68. The camera data connection 68 can allow information (e.g., image data, operational commands, power, etc.) to pass between the ECU 56 and the rear-mounted video camera 50. The ECU 56 also includes a normally closed feedback alarm circuit 70. The alarm circuit 70 may run through the releasable connector 64 and provides a feedback signal to the ECU 56 indicating that the tailgate assembly 32 with the rear-mounted video camera 50 is in place.

Figure 3:
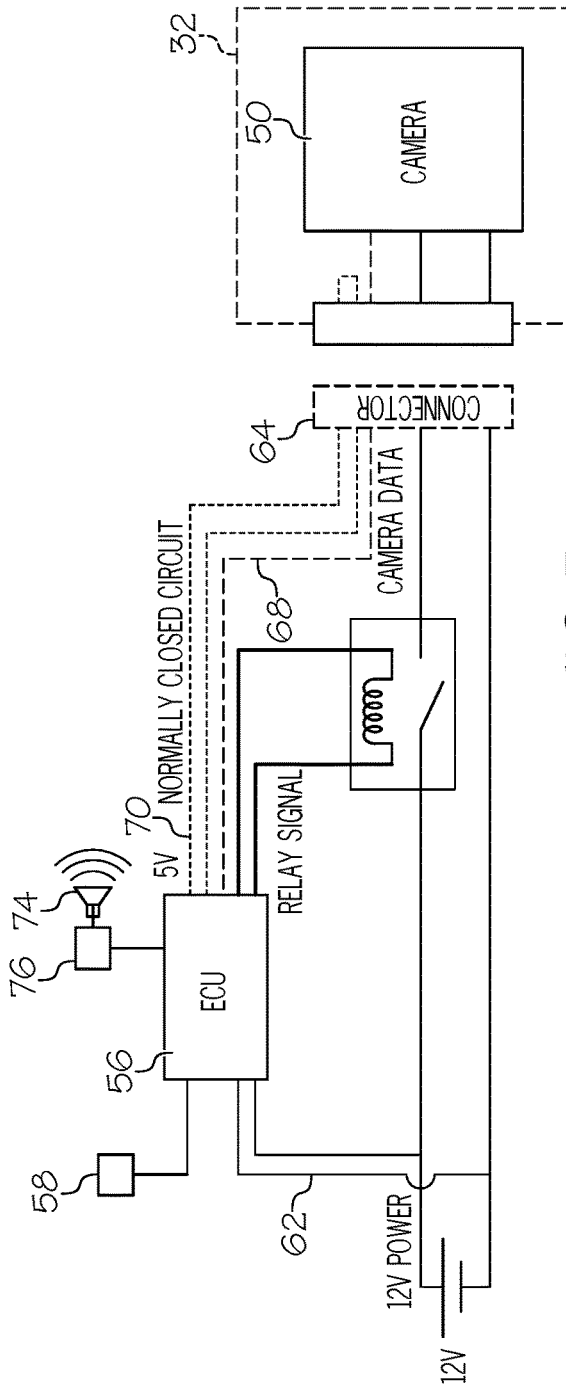
FIG. 3 is a schematic view of the tailgate alarm system of FIG. 2 in an open configuration, according to one or more embodiments shown and described herein.

Referring to FIG. 3, if the tailgate assembly 32 is removed, the releasable connector 64 opens, which opens the alarm circuit 70 thereby stopping the feedback signal. The ECU 56 includes logic that, when executed by a non-transitory processor, causes the ECU 56 to look for the feedback signal and, when the feedback signal is not present, instruct a vehicle alarm system 76 to activate one or more vehicle alarm 74. In some embodiments, the ECU 56 detects whether one or more vehicle doors (e.g., the driver vehicle door) is in a locked state before instructing the alarm system 76 to activate the vehicle alarm 74. The vehicle alarm 76 may include one or more of sounds, lights, displays, notifications, such as SMS, email, haptic feedback, etc. In some embodiments, the alarm can be deactivated using a key fob, a user input device inside the vehicle 10 and/or a computing device, such as a smartphone, for example, through an application. The ECU 56 may control/activate other video cameras that can capture images surrounding the vehicle 10 in an attempt to identify the remover of the tailgate assembly 32. In some embodiments, the ECU 56 instructs the vehicle alarm system 76 to activate the vehicle alarm 74 only if the vehicle 10 is locked. The camera system of FIGS. 2 and 3 may be used with video cameras that are not always on (normal power consumption systems).

FIGS. 4 and 5 illustrate a similar tailgate alarm system as FIGS. 2 and 3, except that an alarm circuit 80 is also connected to a rear-mounted vehicle camera 82. In this embodiment, an ECU 84 may instruct vehicle alarm system 86 to activate an alarm if the tailgate assembly 88 with rear-mounted video camera 82 is removed thereby opening releasable connector 90. The ECU 84 may also instruct vehicle alarm system 86 to activate an alarm if the tailgate assembly 88 remains in place and the rear-mounted video camera 82 is removed from the tailgate assembly 88 with the tailgate assembly remaining in place.

Referring to FIGS. 6 and 7, another tailgate alarm system is shown that uses a camera data connection 92 as an alarm circuit. In this embodiment, an alarm circuit separate from the camera data connection 92 is not used and ECU 94 monitors a signal from rear-mounted video camera 96. The rear-mounted video camera 96 may always be active so that a signal indicative of its presence is always provided to the ECU 94 unless tailgate assembly 98 is removed, opening releasable connector 100 and/or the rear-mounted video camera 96 is removed.

Figure 8:
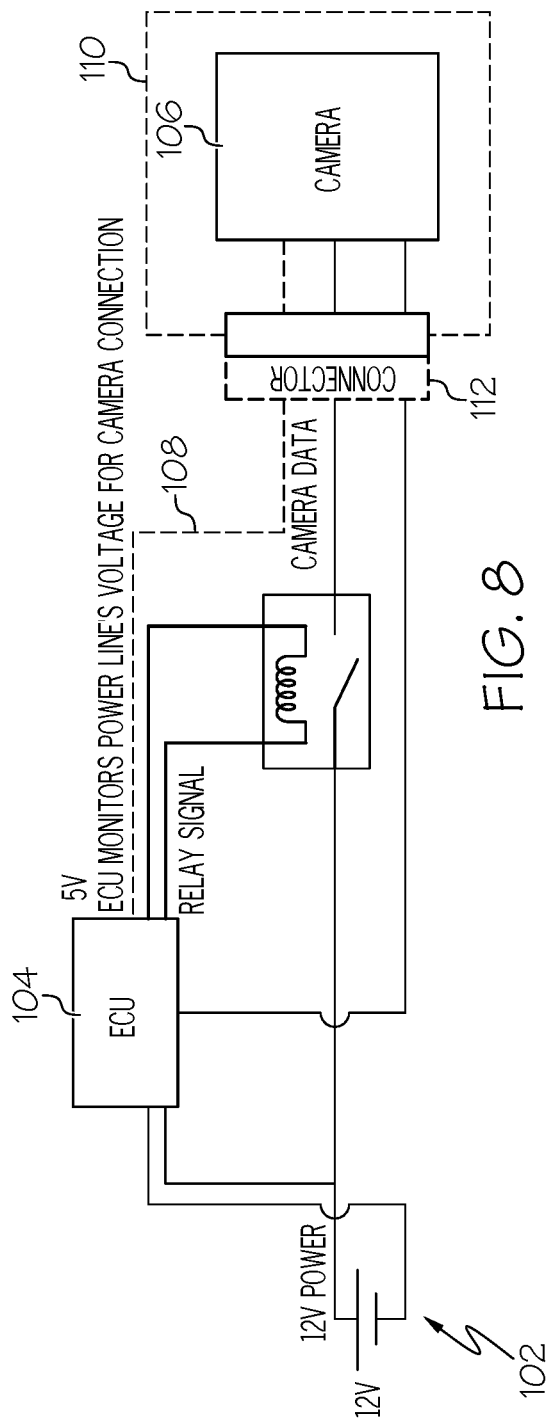
FIG. 8 is a schematic view of another tailgate alarm system of use with the vehicle of FIG. 1 in a closed configuration, according to one or more embodiments shown and described herein.
Figure 9:
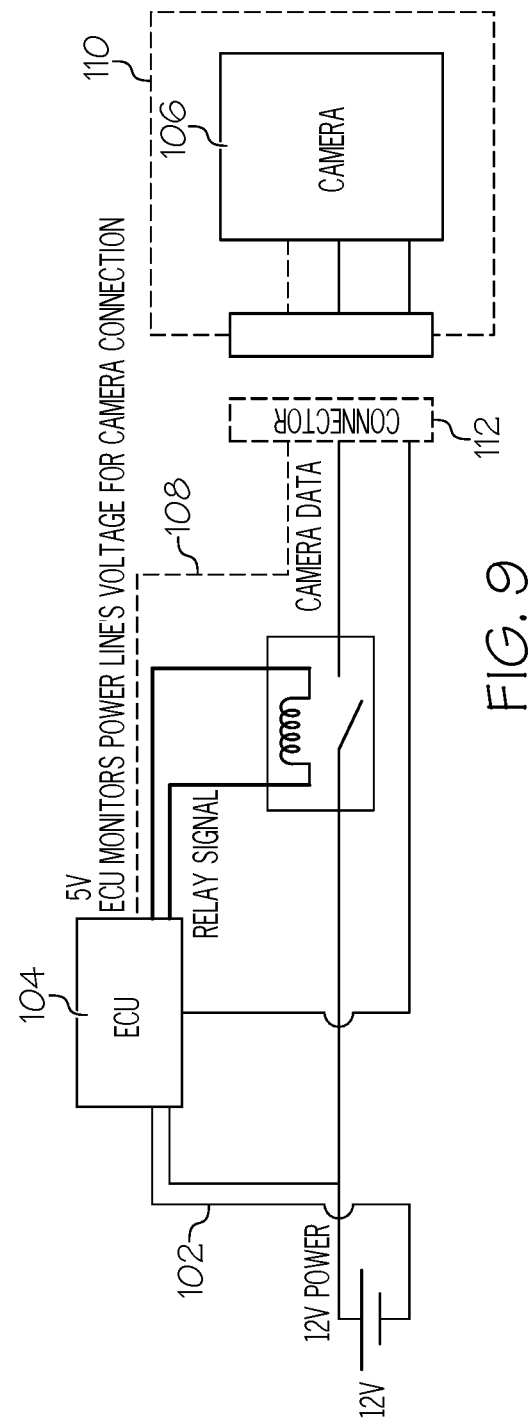
FIG. 9 is a schematic view of the another tailgate alarm system of FIG. 8 in an open configuration, according to one or more embodiments shown and described herein.

Referring to FIGS. 8 and 9, another camera system is shown that uses an input power circuit 102 for the ECU 104 and rear-mounted video camera 106 as an alarm circuit. Again, in this embodiment, an alarm circuit separate from camera data connection 108 and the input power circuit 102 is not used. The ECU 104 monitors power through the input power circuit 102. The rear-mounted video camera 106 may always be active so that a signal indicative of its presence is always provided to the ECU 104 unless tailgate assembly 110 is removed opening releasable connector 112 and/or rear-mounted video camera 106 is removed.

Figure 10:
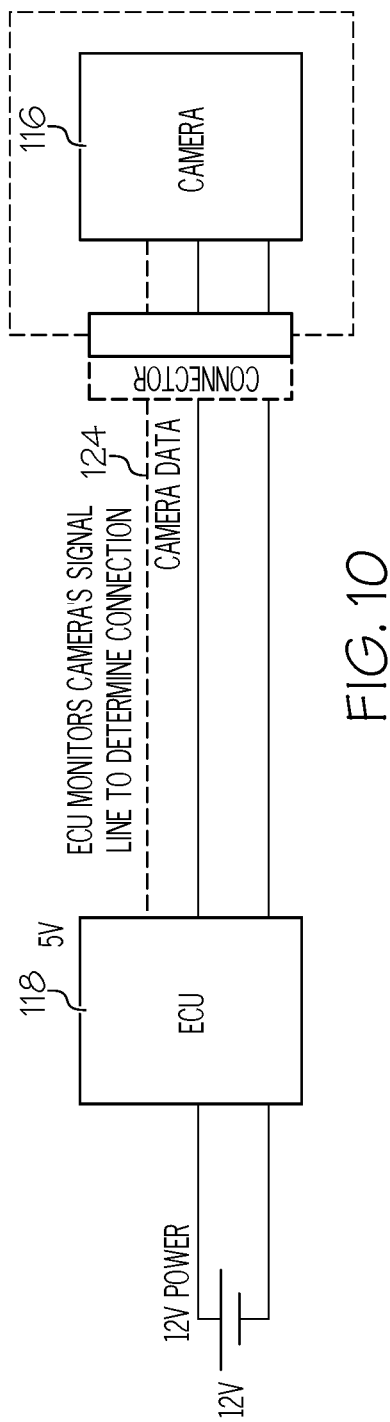
FIG. 10 is a schematic view of another tailgate alarm system of use with the vehicle of FIG. 1 in a closed configuration, according to one or more embodiments shown and described herein.
Figure 11:
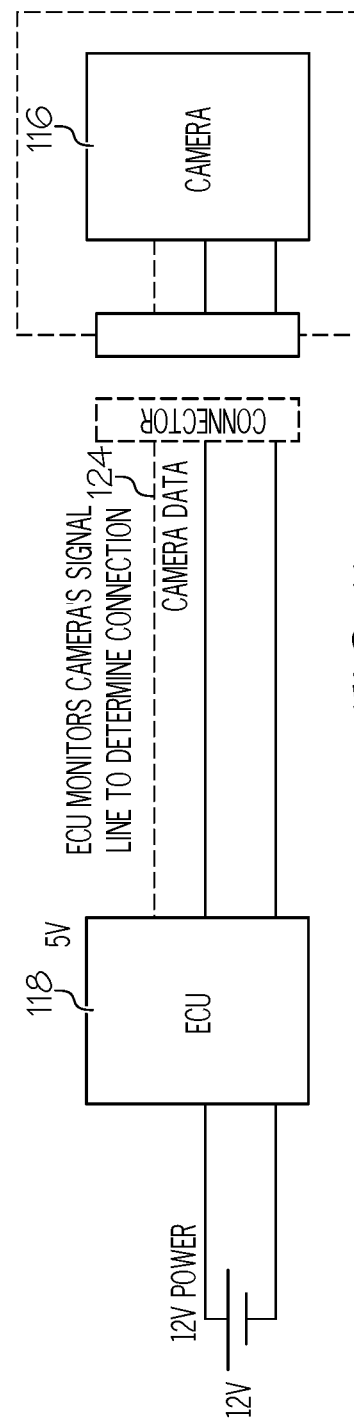
FIG. 11 is a schematic view of the another tailgate alarm system of FIG. 10 in an open configuration, according to one or more embodiments shown and described herein.

Referring to FIGS. 10 and 11, another camera system is shown that does not include a relay circuit that is used above to selectively open and close input power circuit directly to and from rear-mounted video camera 116, bypassing ECU 118. In this embodiment, ECU 118 monitors a signal from the rear-mounted video camera 116. In this regard, camera data connection 124 serves as the alarm circuit. The rear-mounted video camera 116 may always be active so that a signal indicative of its presence is continuously provided to the ECU 118 unless tailgate assembly 122 is removed opening releasable connector 124 and/or rear-mounted video camera 116 is removed.

Figure 12:
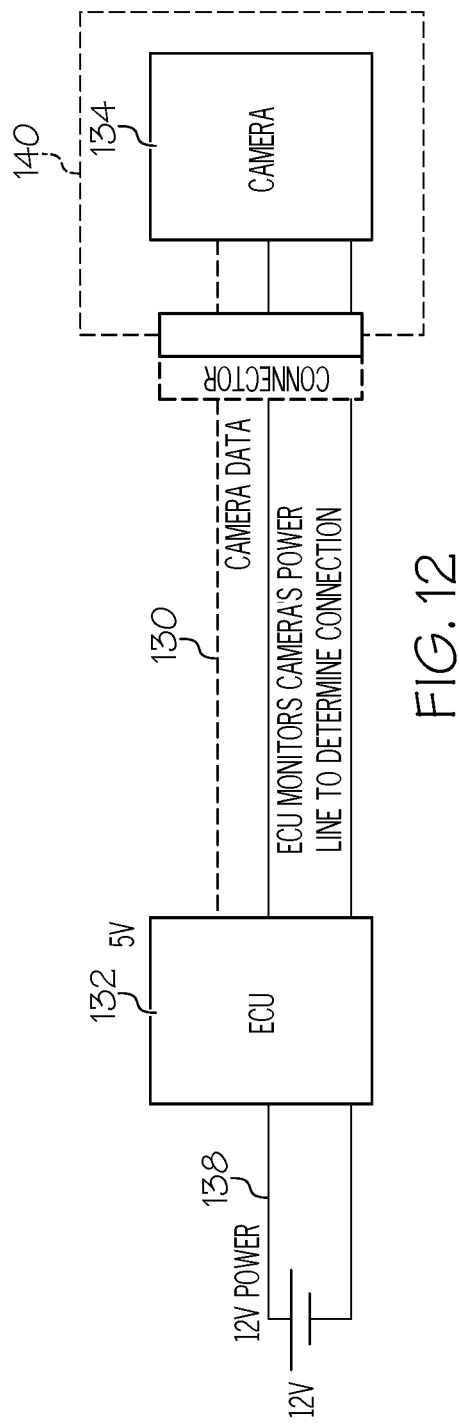
FIG. 12 is a schematic view of another tailgate alarm system of use with the vehicle of FIG. 1 in a closed configuration, according to one or more embodiments shown and described herein.
Figure 13:
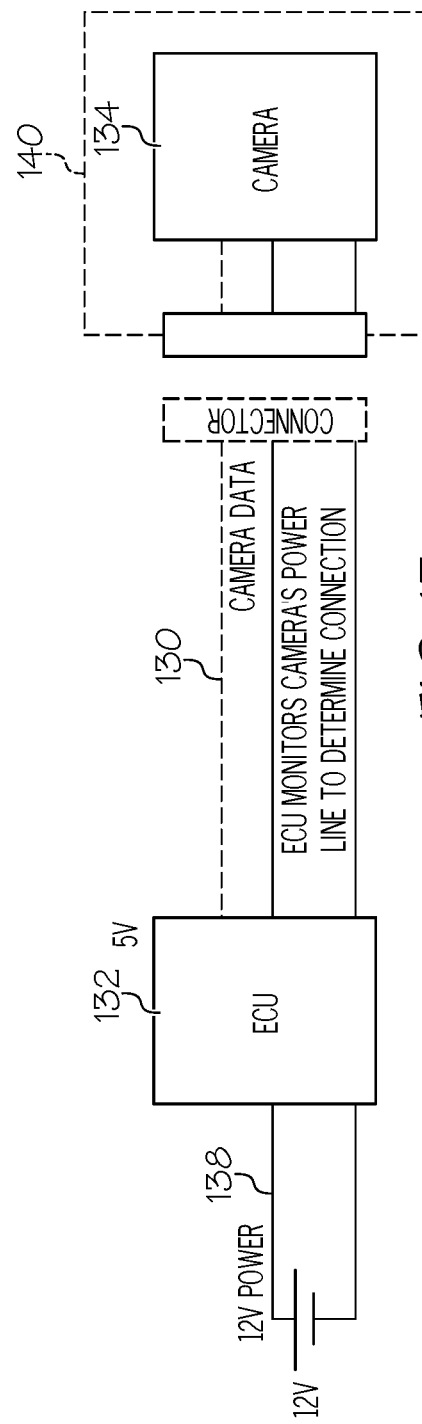
FIG. 13 is a schematic view of the another tailgate alarm system of FIG. 12 in an open configuration, according to one or more embodiments shown and described herein.

Referring to FIGS. 12 and 13, another camera system is shown that uses a camera data connection 130 for ECU 132 and rear-mounted video camera 134 as an alarm circuit. Again, in this embodiment, an alarm circuit separate from camera data connection 130 and input power circuit 138 is not used. The ECU 132 monitors a signal provided by the rear-mounted video camera 134. The rear-mounted video camera 134 may always be active so that a signal indicative of its presence is continuously provided to the ECU 132 unless tailgate assembly 140 is removed opening releasable connector and/or rear-mounted video camera 134 is removed.

The above-described systems and methods to detect and notify of a tailgate removal utilize existing rear-mounted video cameras and alarm systems. Almost all current trucks and other vehicles include rear-mounted video cameras. The tailgate assembly is a part of the alarm circuit. Removal of the tailgate assembly results in the alarm circuit being opened, which a vehicle ECU uses to identify that the tailgate assembly has been removed.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a cabin;
a vehicle body comprising a cargo area rearward of the cabin,
a tailgate assembly mounted to the vehicle body that closes the cargo area, the tailgate assembly comprising a rear-mounted video camera;
an electronic control unit that receives image data from the rear-mounted video camera;
a connector that communicatively couples the electronic control unit and the rear-mounted video camera, wherein the connector has a closed configuration with the tailgate assembly mounted to the vehicle body and an open configuration with the tailgate assembly removed from the vehicle body;
wherein the electronic control unit includes logic that, wherein executed by a non-transitory processor, causes the electronic control unit to:
receive signals from an alarm circuit when the connector is in the closed configuration; and
detect when the signals from the alarm circuit have stopped when the connector is in the open configuration.

2. The vehicle of claim 1, wherein the electronic control unit instructs an alarm to be activated after detecting when the signals from the alarm circuit have stopped.

3. The vehicle of claim 2, wherein the electronic control unit detects whether one or more vehicle door is in a locked state before instructing the alarm to be activated.

4. The vehicle of claim 1, wherein the alarm circuit comprises a closed loop alarm circuit.

5. The vehicle of claim 4 further comprising a camera data connection that delivers image data from the rear-mounted camera to the electronic control unit through the connector.

6. The vehicle of claim 5 further comprising an input power circuit that delivers power to one or both of the electronic control unit and the rear-mounted video camera through the connector.

7. The vehicle of claim 1, wherein the alarm circuit comprises camera data connection that delivers image data from the rear-mounted camera to the electronic control unit through the connector.

8. The vehicle of claim 1, wherein the alarm circuit comprises an input power circuit that delivers power to the electronic control unit and through the connector to the rear-mounted video camera.

9. The vehicle of claim 1, wherein the connector is a two-part connector where a first part is carried by the vehicle body and a mating second part is carried by the tailgate assembly.

10. A method of providing an alarm circuit used by an electronic control unit in determining if a tailgate assembly of a vehicle has been removed from a vehicle body, the method comprising:
communicatively coupling the electronic control unit to a rear-mounted video camera carried by the tailgate assembly using a connector, wherein the connector has a closed configuration with the tailgate assembly mounted to the vehicle body and an open configuration with the tailgate assembly removed from the vehicle body;
communicatively coupling an alarm circuit to the electronic control unit and the connector, the alarm circuit providing signals to the electronic control unit with the connector in the closed configuration; and
the electronic control unit including logic that, when executed by a non-transitory processor, detects that the signals from the alarm circuit have stopped and instructs an alarm to be activated if the signals have stopped.

11. The method of claim 10 wherein the electronic control unit determines whether a vehicle door is locked before instructing the alarm to be activated.

12. The method of claim 10, wherein the alarm circuit comprises a closed loop alarm circuit.

13. The method of claim 12 further comprising a camera data connection delivering image data from the rear-mounted camera to the electronic control unit through the connector.

14. The method of claim 13 further comprising an input power circuit delivering power to one or both of the electronic control unit and the rear-mounted video camera through the connector.

15. The method of claim 10, wherein the alarm circuit comprises camera data connection delivering image data from the rear-mounted camera to the electronic control unit through the connector.

16. The method of claim 10, wherein the alarm circuit comprises an input power circuit delivering power to the electronic control unit and the rear-mounted video camera.

17. The method of claim 10, wherein the connector is a two-part connector where a first part is carried by the vehicle body and a mating second part is carried by the tailgate assembly.

18. The method of claim 10, wherein the electronic control unit instructing an alarm to be activated after detecting when the electronic signals from the alarm circuit have stopped.

* * * * *